Patented July 19, 1949

2,476,464

UNITED STATES PATENT OFFICE 2,476,464

INTERMEDIATES FOR THE PRODUCTION OF VITAMIN B₆ AND PROCESSES OF PREPARING THE SAME

Eric T. Stiller, Chagrin Falls, Ohio, assignor to Merck & Co., Inc., Rahway, N. J., a corporation of New Jersey No Drawing. Original application November 15, 1940, Serial No. 365,758. Divided and this application January 4, 1945, Serial No. 571,361

6 Claims. (Cl. 260—295)

This is a division of my co-pending application Serial No. 365,758, filed November 15, 1940, which is now Patent No. 2,372,690, issued April 3, 1945.

This invention relates to intermediates for the production of vitamin B₆, and to processes of preparing the same.

I have discovered that compounds of the formula:

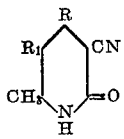

wherein R is selected from the group consisting of methyl and alkoxymethyl, and R₁ is selected from the group consisting of acylamino, acylaminomethyl and aminomethyl, are valuable intermediates for the production of vitamin B₆.

The novel compounds of the present invention may be prepared, for example, by reacting 3-acetylamino-acetyl-acetone with cyanoacetamide in the presence of an organic solvent, and a basic catalyst selected from the group consisting of an aliphatic amine and a saturated heterocyclic amine to form 3-cyano-4,6-dimethyl-5-acetylamino-pyridone-2.

Upon reacting 3-acetylamino-1-ethoxypentane-2,4-dione and cyanoacetamide in the presence of an organic solvent, and the above basic catalyst, there is obtained 3-cyano-4-ethoxymethyl-5-acetylamino-6-methyl-pyridone-2.

Upon reacting 3-benzoylaminomethyl-pentane-2,4-dione with cyanoacetamide in the presence of an organic solvent, and the above basic catalyst, there is obtained 3-cyano-4,6-dimethyl 5-benzoylaminomethyl-pyridone-2.

Upon reacting 1-ethoxy-3-benzoylaminomethyl-pentane-2,4-dione and cyanoacetamide in the presence of an organic solvent, and the above basic catalyst, there is obtained 3-cyano-4-ethoxymethyl- 5 -benzoylaminomethyl-6-methyl-pyridone-2.

Example I 0.5 gm. of 3-acetylamino-acetyl-acetone are mixed with 0.27 gm. of cyanoacetamide, and dissolved in 18 cc. of alcohol. Three drops of piperidine are added, and the solution refluxed for 45 minutes, during which time crystalline material separates. On cooling, the crystalline material is filtered off, and recrystallized from alcohol. 3-cyano - 4,6 - dimethyl-5-acetylamino - pyridone-2 is obtained as colorless needles, M. P. above 300° C. Yield 0.3 gm.

Example II 2 gms. of 3-acetylamino-1-ethoxypentane-2,4-dione and 0.85 gm. of cyanoacetamide are dissolved in 25 cc. of alcohol, and six drops of piperidine are added. The mixture is refluxed for two hours and then cooled to 0° C. After standing for some hours, the crystalline material is filtered off, and recrystallized from alcohol. 3-cyano-4-ethoxymethyl-5-acetylamino-6-methyl-pyridone-2 is obtained as clusters of colorless fine needles, M. P. 262-3° (decomposition).

Example III 0.55 gm. of 3-benzoylaminomethyl-pentane-2,4 dione in 10 cc. of dioxane are mixed with 0.2 gm. of cyanoacetamide, and two drops of piperidine are added. The mixture is refluxed for three hours. On cooling, and the addition of a little water, crystallization takes place. 3-cyano-4,6-dimethyl-5-benzoylaminomethyl - pyridone-2 is obtained in the form of colorless prisms, M. P. 316° C. (decomposition).

Example IV 1.65 gms. of 1-ethoxy-3-benzoylaminomethyl-pentane-2,4-dione are dissolved in 20 cc. of ethyl alcohol and 0.5 gm. cyanoacetamide, 2 drops of piperidine are added, and the mixture boiled under reflux for three hours. On cooling, 0.37 gm. of 3-cyano-4-ethoxymethyl-5-benzoylaminomethyl - 6-methyl-pyridone-2 are obtained as pale yellow plates. The product is purified by dissolving in glacial acetic acid, followed by the addition of a small amount of water, and is obtained as small colorless plates, M. P. 275-6° C. (decomposition).

If desired, the end products of Examples 1 and 2 may be hydrolyzed to the 5-amino compound by treatment with hydrochloric acid, and the end products of Examples 3 and 4 may be hydrolyzed to the 5-aminomethyl compound by treatment with hydrochloric acid.

Other alkoxymethyl substituents in the 4 position may be obtained, for example, by condensing 1-methoxy-3-acetylamino-pentane-2,4-dione, or 1-methoxy - 3 - benzoylaminomethyl-pentane-2,4-dione with cyanoacetamide in the presence of an organic solvent and the basic catalyst.

Other pyridones, having an acylamino or acylamino-methyl group as a substituent in the 5 position, may be obtained by condensing other appropriate 1 - alkoxy - 3 - acylamino-pentane-2,4-diones or 1-alkoxy-3-acylaminomethyl-pentane-2-4-diones with cyanoacetamide in the presence of an organic solvent and the basic catalyst. Pyridones of this type are disclosed in my copending application Serial No. 309,574, filed December 16, 1939, which is now Patent 2,306,765, issued December 29, 1942.

Modifications may be made in carrying out the present invention without departing from the spirit and scope thereof, and I am to be limited only by the appended claims.

What is claimed is:

1. 3-cyano-4-alkoxymethyl-5-acylamino-methyl-6-methyl-pyridone-2.

2. 3-cyano-4-ethoxymethyl-5-benzoylaminomethyl-6-methyl-pyridone-2.

3. In the process of preparing a vitamin $B_6$ intermediate, the steps which comprise reacting 1-alkoxy-3-acylaminomethyl-pentane-2:4-dione and cyanoacetamide in the presence of an organic solvent, and a basic catalyst selected from the group consisting of an aliphatic amine and a saturated heterocyclic amine and recovering 3-cyano-4-alkaoxymethyl-5-acylaminomethyl-6-methyl-pyridone-2.

4. 3-cyano-4-methoxymethyl-5-acetylaminomethyl-6-methyl-pyridone-2.

5. In the process for preparing a vitamin $B_6$ intermediate, the steps which comprise reacting 1-ethoxy-3-benzoylaminomethyl-pentane-2,4-dione and cyanoacetamide in the presence of an organic solvent, and a basic catalyst selected from the group consisting of an aliphatic amine and a saturated heterocyclic amine and recovering 3-cyano-4-ethoxymethyl-5-benzoylaminomethyl-6-methyl-pyridone-2.

6. In the process of preparing a vitamin $B_6$ intermediate, the steps which comprise reacting 1-methoxy-3-acetylaminomethyl-pentane-2,4-dione and cyanoacetamide in the presence of an organic solvent, and a basic catalyst selected from the group consisting of an aliphatic amine and a saturated heterocyclic amine and recovering 3-cyano-4-methoxymethyl-5-acetylaminomethyl-6-methyl-pyridone-2.

ERIC T. STILLER.

No references cited.